United States Patent [19]
Solomon

[11] Patent Number: 5,809,683
[45] Date of Patent: Sep. 22, 1998

[54] BATTERY-POWERED APPARATUS TO PROVIDE MOVABLE WINGS AND FEET ON WATERFOWL DECOYS, INCLUDING METHOD OF ASSEMBLY

[76] Inventor: Walter Solomon, 505 N. Price St., Marshall, Tex. 75670

[21] Appl. No.: 675,960

[22] Filed: Jul. 5, 1996

[51] Int. Cl.⁶ .................................................. A01M 31/06
[52] U.S. Cl. ........................................................... 43/3
[58] Field of Search ................................... 43/2, 3, 26.1

[56] References Cited

U.S. PATENT DOCUMENTS

| 2,443,040 | 6/1948 | Jones | 43/3 |
|---|---|---|---|
| 2,480,390 | 8/1949 | Thompson | 43/3 |
| 2,704,416 | 3/1955 | Laird | 43/3 |
| 2,747,314 | 5/1956 | McGregor | 43/3 |
| 2,799,960 | 7/1957 | Riley | 43/3 |
| 2,814,146 | 11/1957 | Propp | 43/3 |
| 2,835,064 | 5/1958 | Webb | 43/3 |
| 3,000,128 | 9/1961 | McAda | 43/3 |
| 3,074,195 | 1/1963 | Vanderpool | 43/3 |
| 4,896,448 | 1/1990 | Jackson | 43/3 |

FOREIGN PATENT DOCUMENTS

383031   11/1932   United Kingdom ................ 43/2

*Primary Examiner*—Kurt Rowan
*Attorney, Agent, or Firm*—Ronald B. Sefrna

[57] ABSTRACT

The apparatus includes a 1.5 volt D-size battery, an electric motor, a rotary disk, and two plastic wing/foot assemblies. The apparatus is mounted inside a commercial waterfowl decoy and provides adjustable wing/foot movement with resulting water splashing actions when the decoy is afloat. These motions enhance the attraction of the decoys to the flying waterfowl.

17 Claims, 8 Drawing Sheets

BATTERY-POWERED APPARATUS TO PROVIDE MOVABLE WINGS AND FEET ON WATERFOWL DECOYS, INCLUDING METHOD OF ASSEMBLY

TECHNICAL FIELD

This invention relates to a battery-powered apparatus providing movable wings and feet for installation on water fowl decoys, so as to provide water splashing and paddling actions for enhanced attraction by water fowl. The apparatus is designed to facilitate installation in various commercial waterfowl (duck and goose) decoys of hollow plastic construction.

BACKGROUND OF THE INVENTION

The ducks we hunt today are not the same ducks we hunted just a few years ago. Waterfowl adapt to the times just like humans. Constant hunting pressure will cause a duck to adjust to its surroundings and become cautious before lighting in a pressured pond or decoy spread. No longer is it a given that ducks will decoy to stationary decoys. The ducks you hunt this year have probably been hunted in the past, so they are not rookies. Due to ever increasing hunting pressure, ducks today can tell the difference between live ducks and stationary decoys. They do this by detecting motion. Real ducks are constantly moving their bodies, flapping their wings and paddling their feet. That is why motion in decoys is probably the single most important factor in duck hunting.

Past attempts to provide motion to waterfowl decoys have been far short from a realistic appearance. These attempts usually involve attachment of external motors to provide some water movement and/or propulsion of the decoy. None of the prior actions provided lifelike movement of the wings and feet of the decoy.

SUMMARY OF THE INVENTION

The present invention relates to a battery-driven motor, which drives a rotary disk with an eccentric pivot screw to which is attached a set of special designed wing/foot assemblies. As the rotary disk turns, the wing/foot assemblies move and create the desired water splashing, wing movement and paddling actions. The speed of the wing movement is adjustable by changing the location of the pivot screw to various apertures in the rotary disk. These apertures are located at different distances from the disk center. (Aperture positions nearer the center result in slower wing movements that do aperture positions closer to the outer rim.)

The operating mechanism consists of a D-cell battery and battery holder, an on-off switch, an electric motor, and a rotary disk with a movable (adjustable) pivot screw, all mounted on a mounting bracket designed for installation into the hull of a decoy. The decoy is fitted for wings and feet that are attached to and run by the motor, giving it the lifelike movement and motion that waterfowl make while on the water.

As the wings flap back and forth, the feet move, giving a ripple effect in the water. Ducks have never experienced the leg, wing, and water movement that makes this decoy unique from all others.

The outfitted decoy constantly swims, paddles its feet, and flaps its wings over an adjustable range of approximately 100–250 times per minute. Its leg action produces a large amount of water movement and its rapidly beating wings can easily be detected even in high wind conditions. Its electric motor is water sealed and will endure hard hunting conditions. It is powered by an easily changed D-cell alkaline battery that has an operating life of 50 hours or more.

BRIEF DESCRIPTION OF THE DRAWINGS

The present invention will be more easily understood by reference to the following detailed description when read in conjunction with the attached drawings, wherein.

DETAILED DESCRIPTION OF THE DRAWINGS

The apparatus is designated for compactness and for ease of assembly into a waterfowl decoy.

Figure 7:
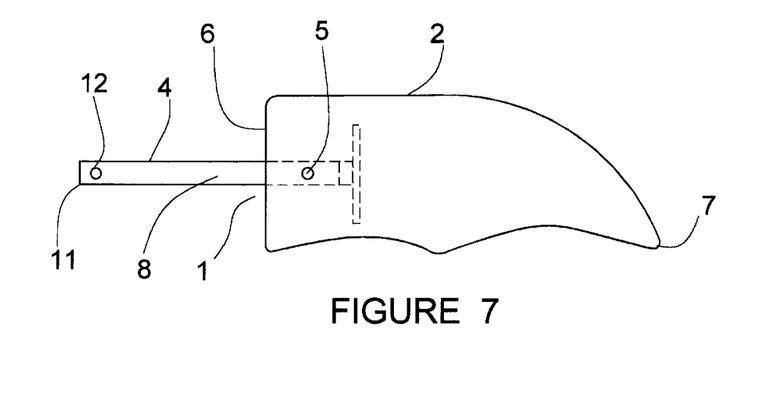
FIG. 7 is a top view of the wing/foot assembly.
Figure 8:
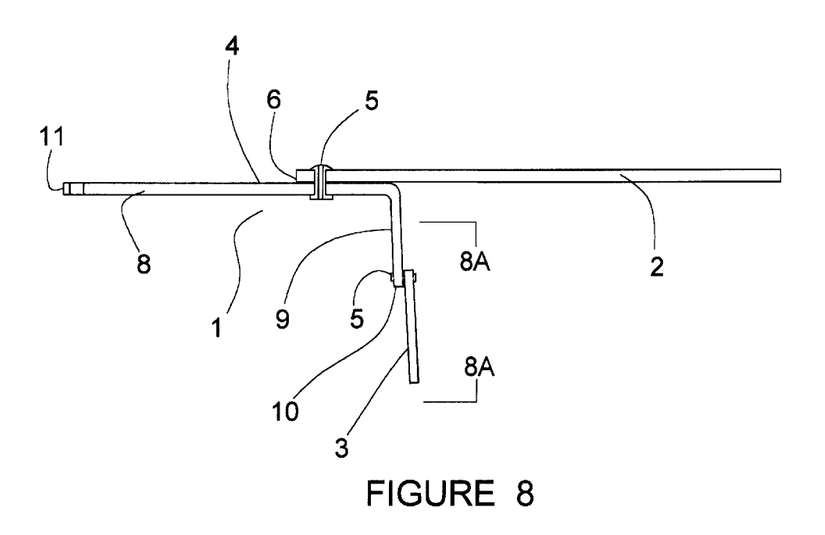
FIG. 8 is a front view of the FIG. 7 configuration.
Figure 8A:
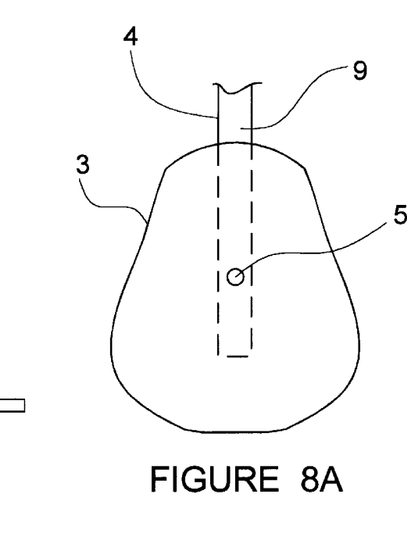
FIG. 8A is a partial side view of FIG. 8 along line 8A showing the foot attachment and configuration.

Each wing/foot assembly 1 consists of a wing 2 and foot 3 attached to a wing support 4 with fasteners 5 (rivets, eyelets or brads). Wing 2 is formed as a generally planar body with an inner edge 6 and an outer tip 7. Wing 2 and foot 3 are made from a semi-flexible plastic sheet so that they retain their shape but flex under movement. Wing support 4 is made from a more rigid plastic strip and is formed into an "L" shape with a long leg 8 and a short leg 9 so that the wing and foot can be attached to a single common piece. Each wing 2 is connected to the long leg 8 of a wing support 4 with the majority of the length of the wing support extending outwardly from inner edge 6 of the wing. The shape of wing supports 4 permits each foot, which is connected to short leg 9 near outer end 10 of the wing support, to contact the water when the decoy is afloat. The wing tips rest upon top of the water, or slightly above. A pivot hole 12 is provided at the inner end 11 of each wing support 4. Pivot hole 12 is sized for a loose fit with pivot screw 13 when mounted on rotary disk 14. The wing/foot assemblies are configured as mirror images of each other.

Figure 1:
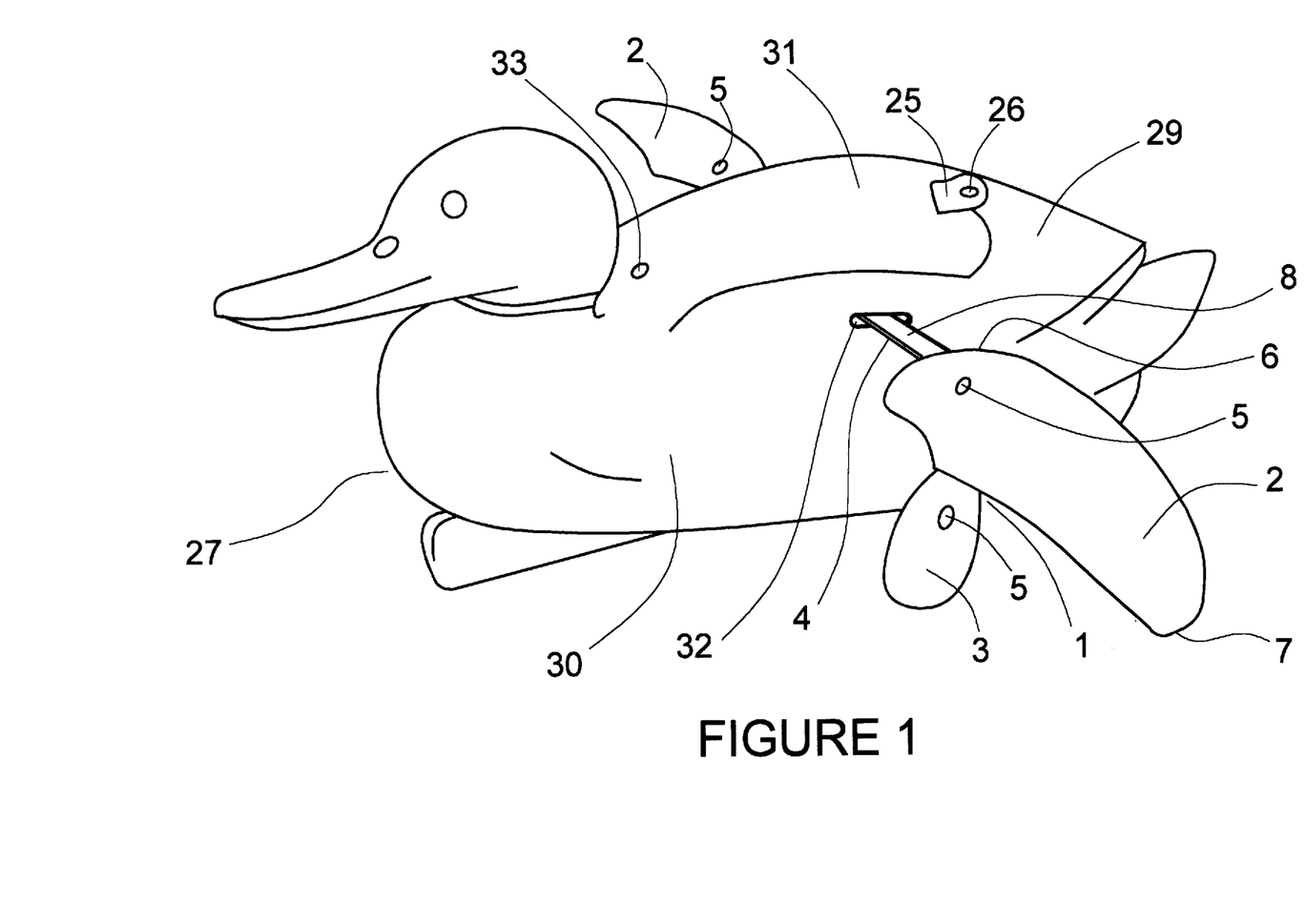
FIG. 1 is an oblique view of the apparatus shown mounted in a duck decoy. This is a "ready for use" configuration.
Figure 2:
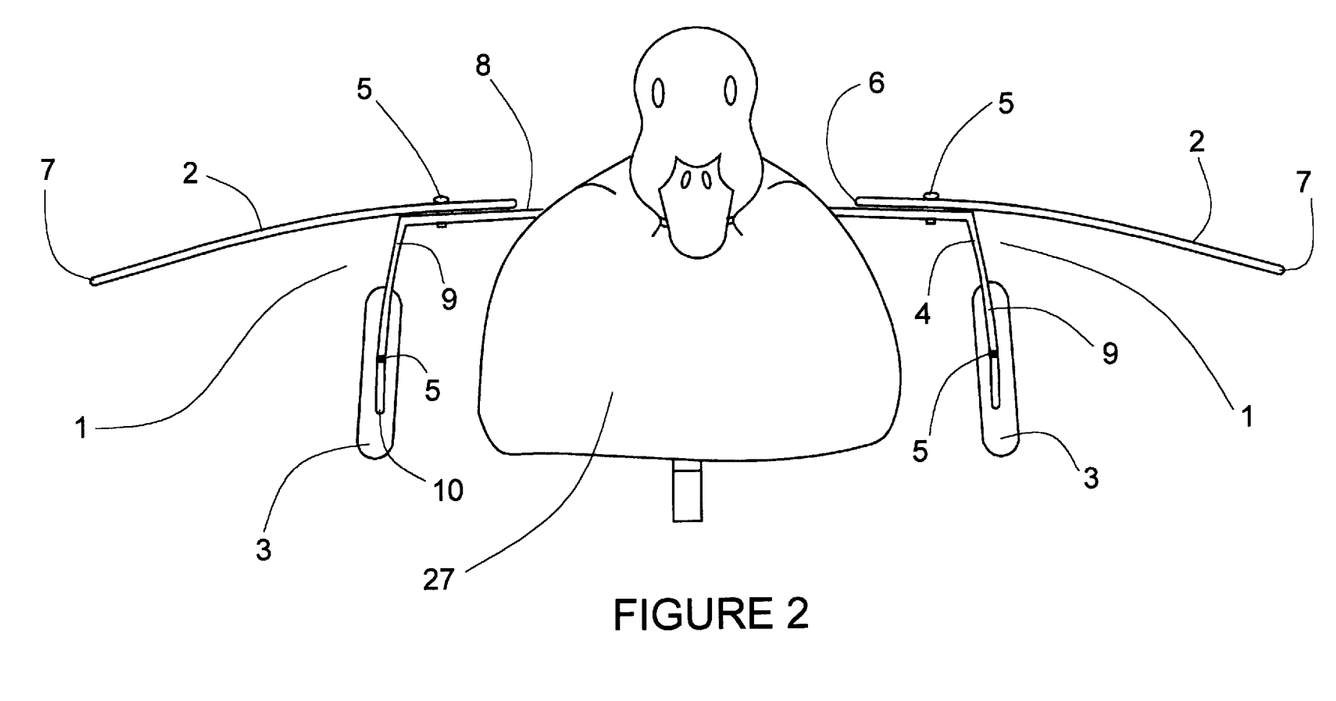
FIG. 2 is a front view of the FIG. 1 configuration.
Figure 3:
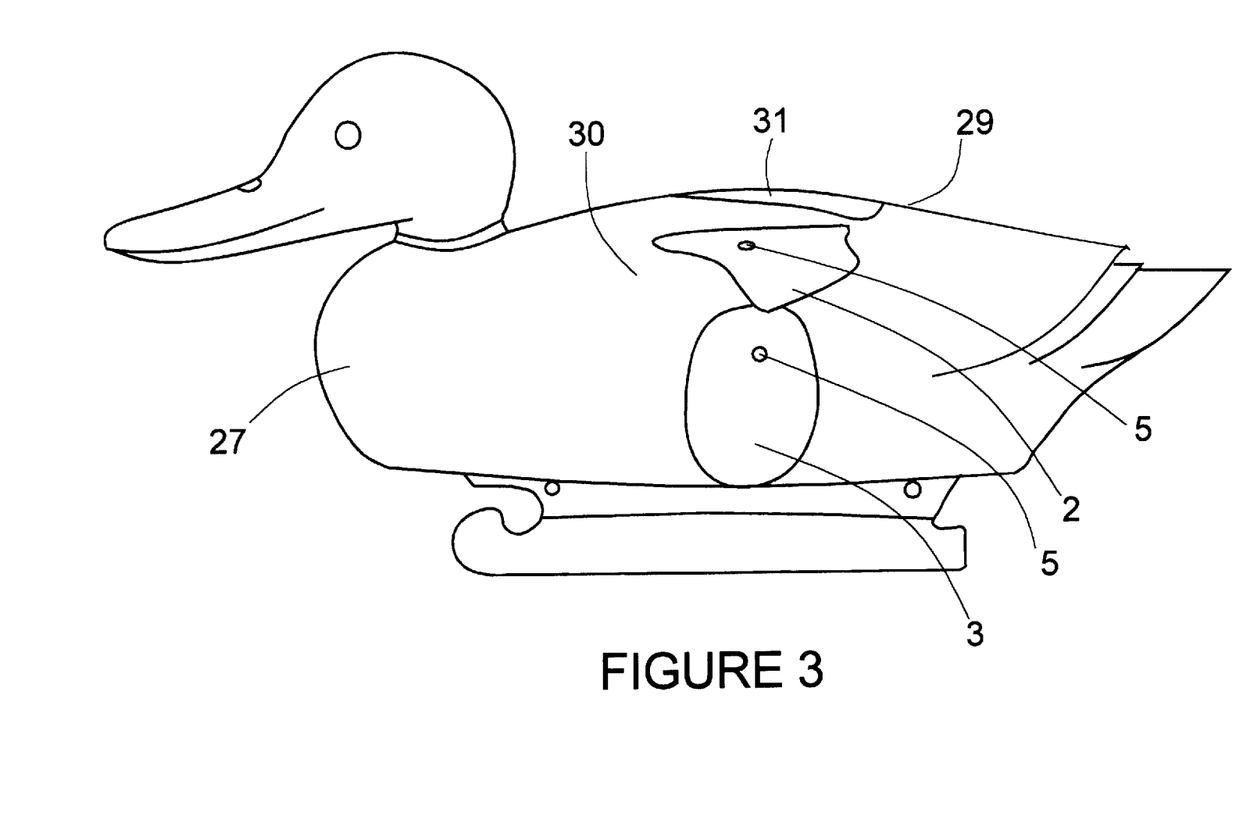
FIG. 3 is a side view of the FIG. 1 configuration.
Figure 4:
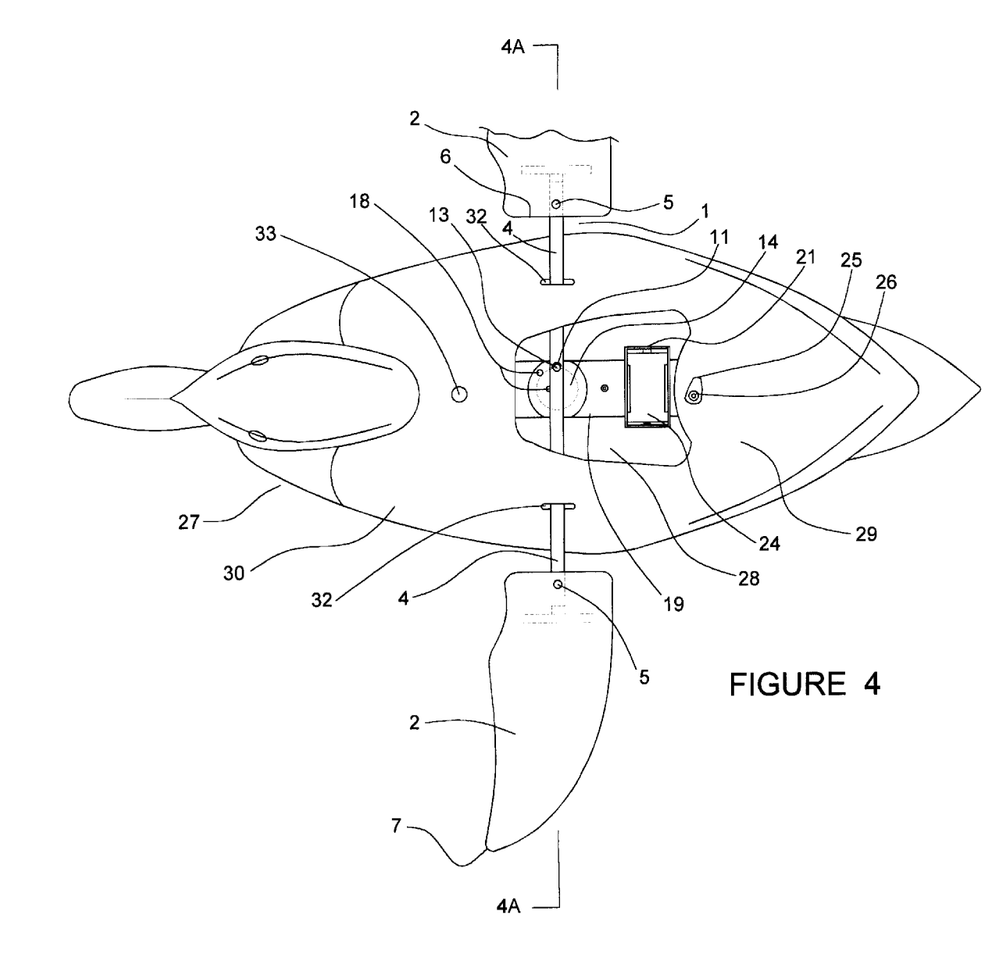
FIG. 4 is a top view of the apparatus installed in a duck decoy, with the lid flap removed to show the installation.
Figure 4A:
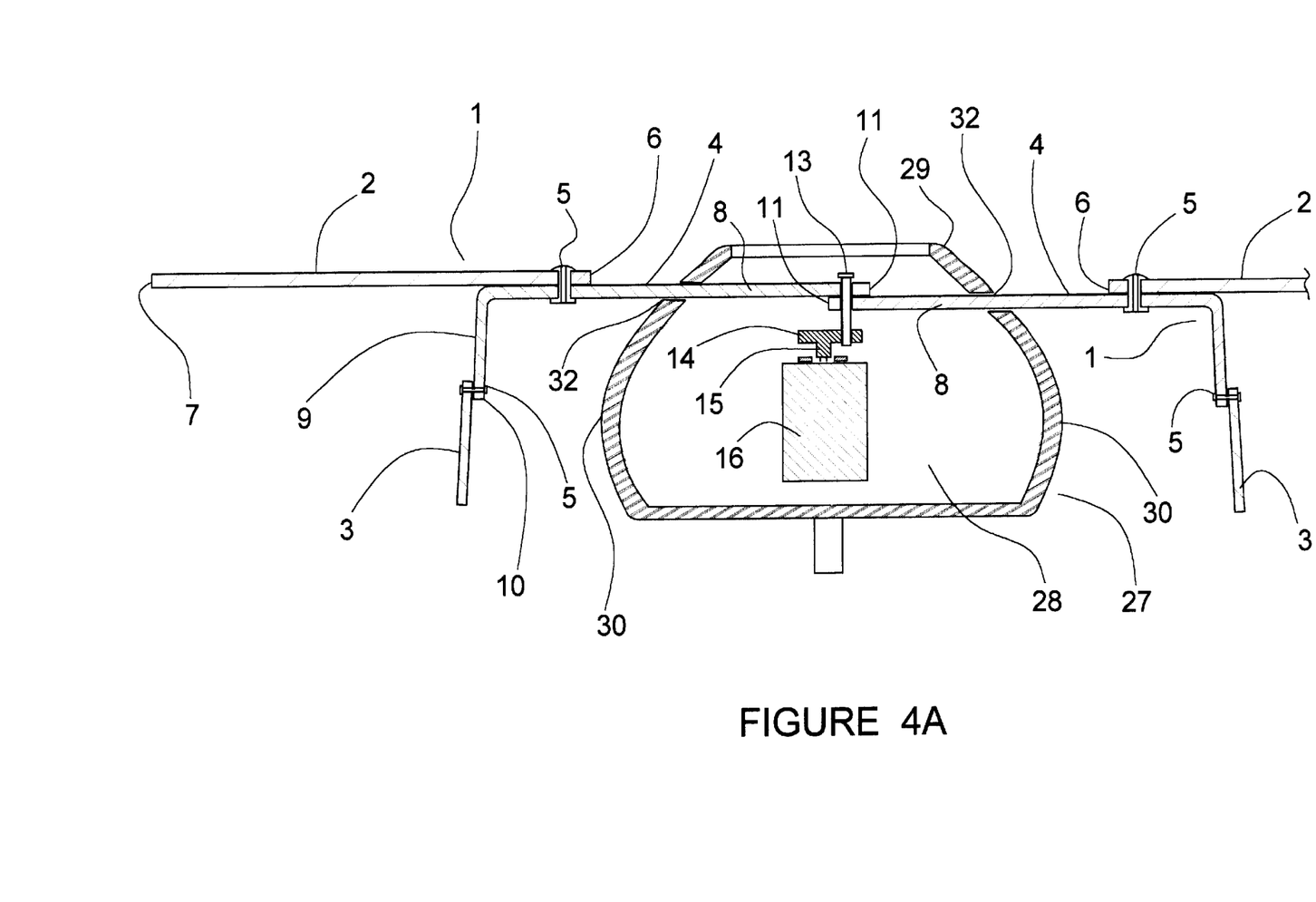
FIG. 4A is a cross-section from FIG. 4 along line 4A showing the operating mechanism of the apparatus.
Figure 5:
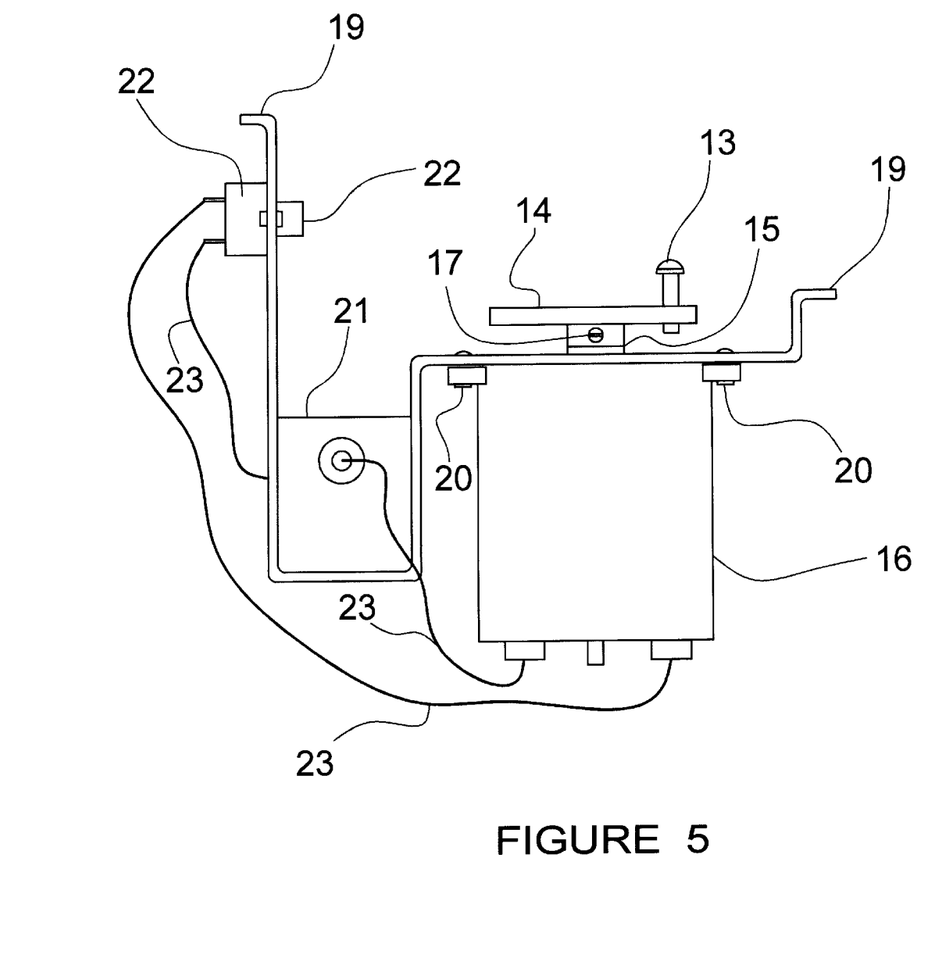
FIG. 5 is a side view of the operating assembly, prior to installation into the decoy.
Figure 6:
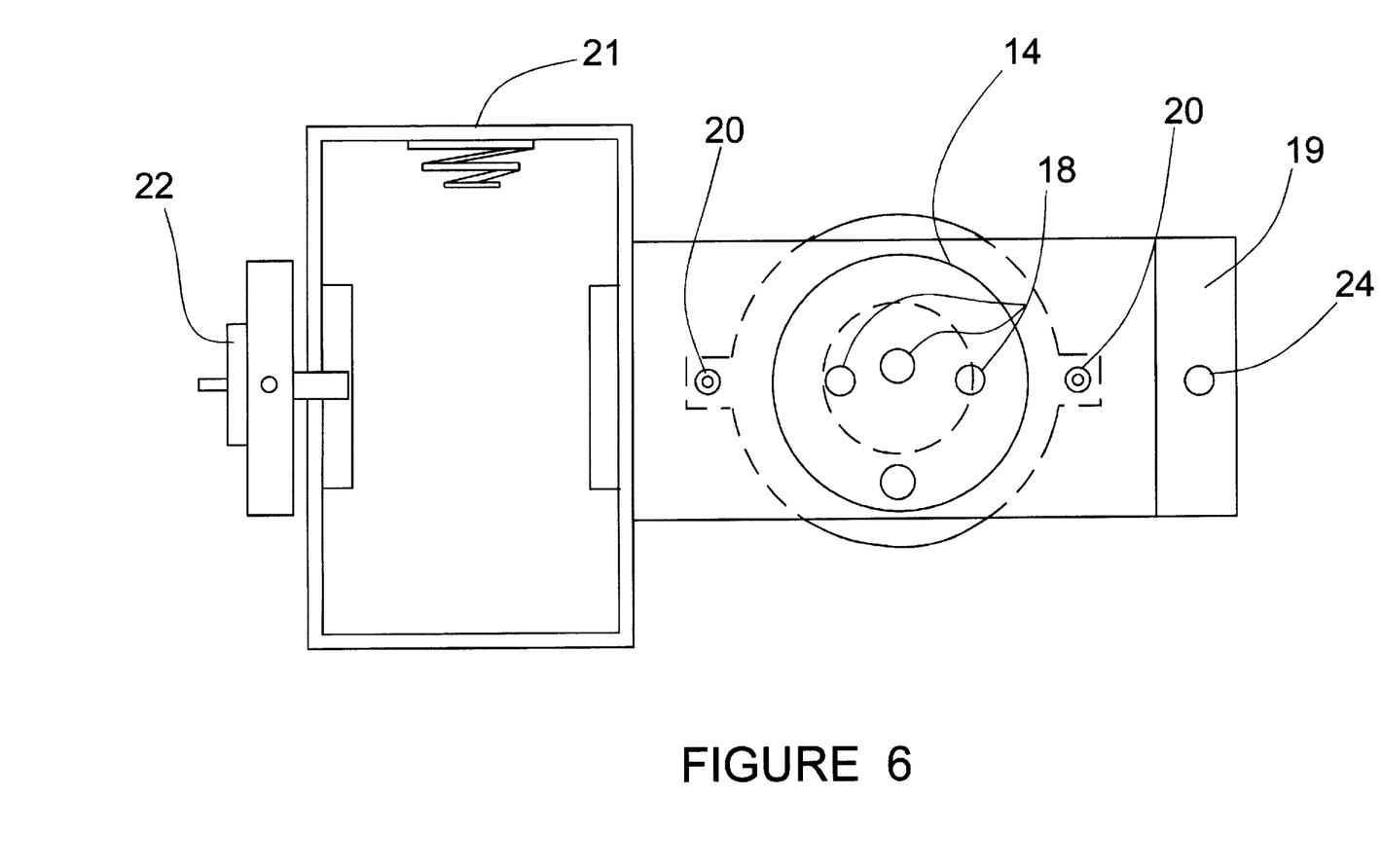
FIG. 6 is a top view of the FIG. 5 configuration.

A rotary disk 14 is secured to the output shaft 15 of motor 16 by set-screw 17. Apertures 18 are located at various distances from the center of rotary disk 14 to receive pivot screw 13. Pivot screw 13 is extended through pivot holes 12 in wing supports 4 and through an aperture 18 to loosely connect the wing/foot assemblies to disk 14. The eccentric location of pivot screw 13 causes the two wing/foot assemblies to move inward and outward as disk 14 rotates. This oscillatory movement causes wing flutter, foot paddling, and water splashing to simulate the actions of live ducks.

Bracket 19 is made from corrosion-resistant aluminum and is shaped to contain the primary components of the apparatus for facilitation of assembly into the decoy. Part 16 consists of a commercial 1.5 volt low speed electric motor which is secured to bracket 19 by fasteners 20 (rivets, eyelets or brads). The no-load speed of the motor is approximately 115 rpm, which results in an operating speed under load of approximately 80 rpm.

A commercial battery holder 21 and commercial on-off slide switch 22 are also secured to bracket 19 by fasteners 20. Battery holder 21 includes positive and negative contacts connected to switch 22 and motor 16 by wiring 23. Battery holder 21 is sized for one 1.5 volt D-cell battery 24.

Lid latch 25 is a semi-rigid plastic strip secured to the top of the decoy with fastener 26 (rivet, eyelet or brad) to serve as a latch for the lid flap. Holes are drilled or punched on the top back of the decoy in the proper location to receive the fasteners for the apparatus mounting bracket 19 and lid latch 25.

The apparatus of the invention is designed for use with a conventional commercial waterfowl decoy constructed with a hull 27 surrounding a hollow interior 28. Hull 27 includes a top 29 and opposing sides 30. The commercial decoy is prepared by cutting a flap 31 in the top to provide an opening for insertion of the apparatus. In addition, a rectangular slot 32 is cut into each side 30 of the hull 27 to receive the plastic support 4 of the wing/foot assembly (FIG. 7 and 8).

The apparatus is inserted through lid flap 31 and held in position while fastener 33 (rivet, eyelet or brad) is used to secure the mounting bracket 19 through bracket holes 34. Fastener 26 is used as a common fastener for both lid latch 25 and the aft end of bracket 19. Motor 16 is positioned in the interior of the hull of the decoy such that disk 14 is generally parallel to the plane defined by slots 32.

The decoy package is delivered to the user without battery 24 and with the two wing/foot assemblies enclosed within the hollow interior of the hull of the decoy. Upon receipt, the user will remove the wing/foot assemblies from the decoy, insert a support 4 through slot 32 in each side of the hull of the decoy, and then lightly secure the inner ends of the two wing supports 4 to rotary disk 14 by extending pivot screw 13 through pivot holes 12 and into an aperture 18 in disk 14. After inserting a 1.5 volt D-cell alkaline batter 24 in battery holder 21 and activating switch 22 to the "on" position, lid flap 31 is closed and secured with lid latch 25. The operating decoy is then ready for placing afloat to attract waterfowl by the movement and splashing of the wings and feet.

When the wing supports are extended through the slots and connected to the disk as described and the decoy is placed in a body of water, the plane defined by the slots is generally parallel to the surface of the water. The wing/foot assemblies extend outwardly from the respective sides of the hull of the decoy, with the wings generally parallel to the plane defined by the slots and to the surface of the water and with the feet extending into the water.

I claim:

1. Apparatus for addition of movable wings and feet to a waterfowl decoy adapted to float on the surface of a body of water, having a hull with a top, two opposing sides, and a hollow interior, the hull including an opening in the top thereof for access to the hollow interior thereof, and the hull also including a pair of opposed slots each disposed in a respective one of the sides of the hull and positioned such that the slots define a plane generally parallel to the surface of the water when the decoy is floating on the surface of a body of water, the apparatus comprising a drive means having a rotatable output shaft, said drive means disposed in said generally perpendicular relation to said plane defined by said slots;

a generally planar disk having a center and an outer edge, said disk connected to said output shaft of said drive means with said disk generally perpendicular to said output shaft and generally parallel to said plane defined by said slots; and a pair of wing/foot assemblies, each including an elongate wing support with an inner end and an outer end, a generally planar wing with an inner edge and an outer tip, connected to said wing support near said outer end thereof such that a major portion of said wing support extends outwardly from said inner edge of said wing, and a generally planar foot connected to said wing support at said outer end thereof with the plane of said foot generally perpendicular to the plane of said wing, each of said wing/foot assemblies disposed on a respective side of said hull of said decoy with said wing support extending through a respective one of said slots and mutually pivotally connected at said inner end thereof to said disk at a point on said disk between said center and said outer edge thereof, with said wing and said foot disposed exterior to said hull such that said wing lies generally parallel to the surface of the water when the decoy is floating on the surface of a body of water and said foot extends into the water from the surface thereof, whereby activation of said motor induces oscillatory movement of said wing/foot assemblies.

2. The apparatus of claim 1, wherein said movement of said wing/foot assemblies is generally parallel to said plane defined by said slots.

3. The apparatus of claim 1, wherein said drive means comprises a battery powered electric motor.

4. The apparatus of claim 3, wherein said drive means further comprises an electric battery electrically connected to said electric motor so as to supply electrical power thereto.

5. The apparatus of claim 4, further comprising a mounting bracket disposed in the interior of said hull and connected to said hull, wherein said electric motor is connected to said mounting bracket and wherein said bracket includes a battery holder to removably receive said electric battery.

6. The apparatus of claim 5, wherein said drive means further comprises a switch means operatively connected between said electric battery and said electric motor for the purpose of selectively activating and deactivating said electric motor.

7. The apparatus of claim 1, wherein said disk includes a plurality of apertures disposed between said center of said disk and said outer edge of said disk with each of said apertures a different distance from said center, wherein each of said wing supports includes a pivot hole at said inner end thereof, and wherein said wing supports are mutually pivotally connected to said disk by a pivot pin extending through said pivot holes of said wing supports and through one of said apertures in said disk.

8. The apparatus of claim 1, further comprising a mounting bracket disposed in the interior of said hull, and wherein said drive means is connected to said mounting bracket.

9. The apparatus of claim 1, wherein each of said wing supports is formed in an L-shaped configuration with a long leg and a short leg, with said long leg including said inner end of said wing support and with said short leg including said outer end of said wing support, wherein each of said feet of said wing/foot assemblies is connected to said short leg of the respective one of said wing supports.

10. The apparatus of claim 1, wherein each of said wings is formed from a flexible, shape retentive material.

11. The apparatus of claim 1, wherein each of said feet is formed from a flexible shape retentive material.

12. The apparatus of claim 1, wherein said disk is caused to rotate at a rate of about 80 revolutions per minute upon activation of said drive means with said wing/foot assemblies connected to said disk.

13. The apparatus of claim 1, wherein said disk is disposed parallel to said plane defined by said slots.

14. A method of adding moveable wings and feet to a waterfowl decoy adapted to float on the surface of a body of water, the decoy having a hollow hull with a top and with opposing sides, comprising the steps of forming a pair of opposed slots in said hull with one of said slots in each of said sides of said hull such that said slots define a plane generally parallel to the surface of a body of water with the decoy floating on said body of water;

connecting a drive means in the interior of said hull, said drive means including a motor with a rotatable output shaft and a generally planar disk having a center and an outer edge, said disk connected to said output shaft of said motor with said disk generally perpendicular to said output shaft and generally parallel to said plane defined by said slots; and connecting a pair of wing/foot assemblies to said drive means, each including an elongate wing support with an inner end and an outer end, a generally planar wing with an inner edge and an outer tip, connected to said wing support near said outer end thereof such that a major portion of said wing support extends outwardly from said inner edge of said wing, and a generally planar foot connected to said wing support at said outer end thereof with the plane of said foot generally perpendicular to the plane of said wing, by extending each of said wing supports through a respective one of said slots from the exterior of said hull such that said inner ends of said wing supports are disposed in the interior of said hull and said wings and feet extend outwardly from said hull generally parallel to said plane defined by said slots, and mutually connecting said inner ends of said wing supports to said disk in pivotal relation thereto, such that activation of said motor so as to cause rotation of said disk will produce an oscillatory motion of said wing/foot assemblies generally in said plane defined by said slots.

15. The method of claim 14, including the preliminary step of forming an opening in said top of said hull by cutting through a portion of said top to form a flap connected to and pivotally moveable between open and closed positions with respect to said hull.

16. The method of claim 15, including the additional step of connecting a latch means to said hull to releasably secure said flap in said closed position.

17. A method of adjusting the degree of movement of the wing of a waterfowl decoy adapted to float on the surface of a body of water, the decoy having a hull with opposing sides, with a hollow interior and with a pair of slots each extending through one of the sides of the hull in opposing relation defining a plane generally parallel to the surface of the body of water, the decoy having a drive mechanism with a rotating disk, having a center and a peripheral edge, disposed generally parallel to the plane defined by the slots, and the decoy having a pair of wing/foot assemblies each having an elongate wing support extending through one of the slots and being pivotally connected at one end to each other and to the rotating disk by a pivot pin extending through mating pivot holes in the wing supports and aperture in the disk so that the wing/foot assemblies are disposed generally in the plane defined by the slots and so that the wing/foot assemblies move in and out relative to the hull of the decoy in response to rotation of the disk, comprising the steps of forming a plurality of apertures in said disk between said peripheral edge and said center of said disk with each of said apertures a different distance from said center;

pivotally connecting said wing supports to said disk by inserting said pivot pin through said wing supports and an aperture near the peripheral edge of said disk to maximize the degree of movement of said wings assemblies upon rotation of said disk; and pivotally connecting said wing supports to said disk by inserting said pivot pin through said wing supports and an aperture near the center of said disk to minimize the degree of movement of said wing/foot assemblies upon rotation of said disk.

* * * * *